Jan. 16, 1945.                D. E. GRAY                2,367,495
REHEATING AND REFORMING OF GLASS ARTICLES
Filed Dec. 9, 1941
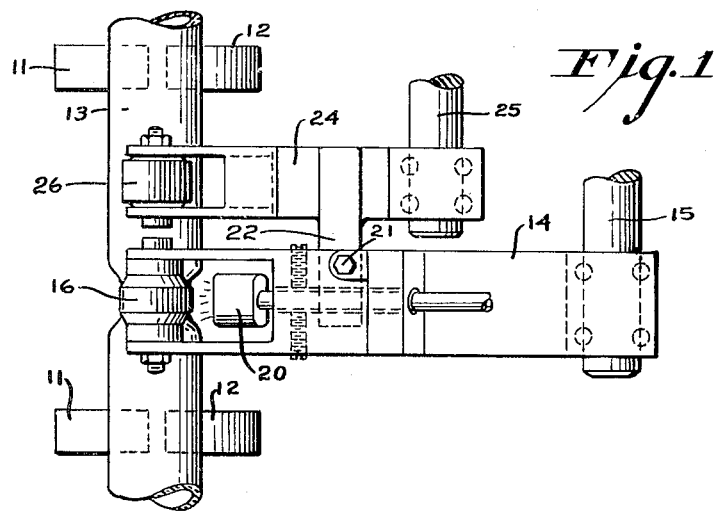
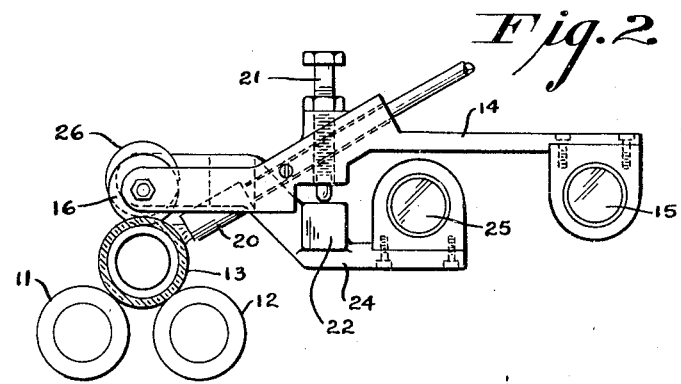
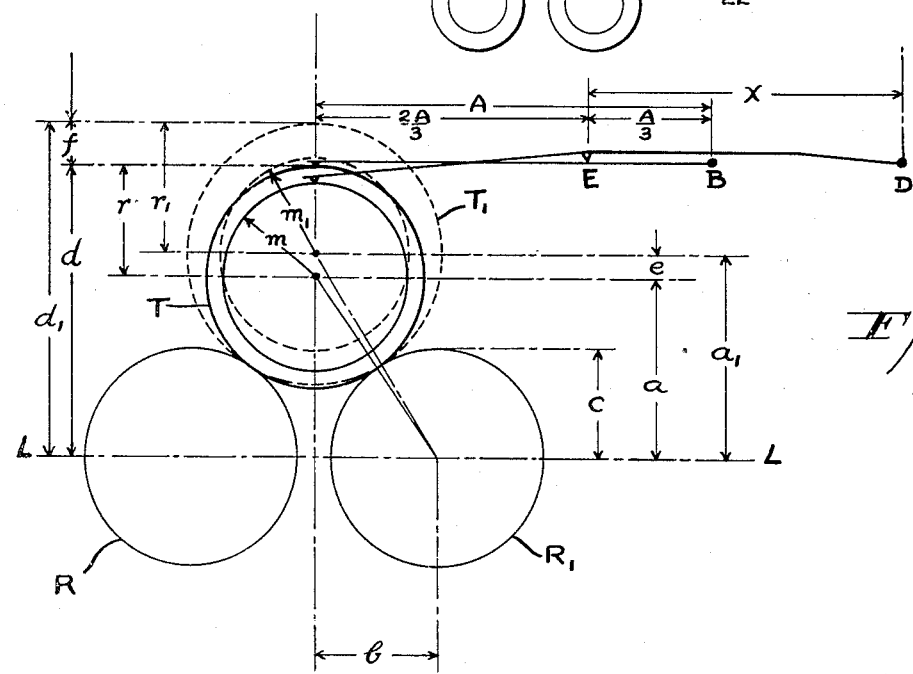
Inventor
DAVID E. GRAY
By
F. H. Knight
Attorney Patented Jan. 16, 1945

2,367,495

UNITED STATES PATENT OFFICE 2,367,495

REHEATING AND REFORMING OF GLASS ARTICLES

David E. Gray, Corning, N. Y., assignor to Corning Glass Works, Corning, N. Y., a corporation of New York Application December 9, 1941, Serial No. 422,300

8 Claims. (Cl. 49—7)

The present invention relates to the reheating and reshaping of glass articles, such for example as vials, the necks of bottles and particularly tubular bodies suitable for use as the envelopes of fluorescent lamps and the like. Most mechanisms employed for this work operate while the glass parts are in rotation so it is highly important that the parts be properly positioned in respect to the forming mechanism because otherwise the work will lack the required symmetry and size. Proper adjustment of the mechanism and a high degree of uniformity of the finished articles are particularly difficult to achieve when, as is often the case, considerable variation of dimensions are encountered in the articles being worked upon.

The principal object of the present invention is a mechanism for reheating and reshaping glass articles to a desired size and contour.

A further object is a mechanism capable of reshaping portions of articles of varying diameter with respect to one another and imparting to the reshaped portions thereof a required shape and size which does not vary materially despite variations in the original articles.

To this and other desirable ends, the invention may be said generally to comprise the combination with a shaping or forming mechanism of means under control of the work for controlling the action of the shaping mechanism. More specifically there is means whose operation modifies the action of the shaping and sizing mechanism to compensate for variations in diameter of the respective pieces of work.

In the following description, reference will be made to the accompanying drawing comprising Figs. 1 and 2 which are respectively a plan view and elevation illustrating mechanism embodying application of the invention to a machine for modifying the form of tubes to be employed as fluorescent lamp envelopes. Fig. 3 is a schematic view on which are indicated the various distances and dimensions which affect and produce the desired result in the machine of Figs. 1 and 2.

Referring to the drawing, 11 and 12 represent pairs of tube supporting rollers either or both pair of which are rotated to impart a turning movement to a tube 13 supported thereon. A tube forming roller supporting arm 14 at one end is pivoted at 15, and at its opposite end carries a tube collar forming roller 16. A burner 20 is supported on arm 14 intermediate the ends thereof and is arranged to direct a softening flame onto the portion of the tube 13 immediately below roller 16. Also intermediate the ends of arm 14 there is provided an adjustable arm supporting screw 21 which is adapted to encounter an anvil 22 carried intermediate the ends of a control arm 24. The control arm 24 at one end is pivoted at 25 and at the other end carries a roller 26 adapted to rest on the tube 13. The extent of downward movement of forming roller 16 into the glass is determined by the extent the arm 14 can be lowered before being stopped by engagement of screw 21 with the anvil 22.

By suitable location of the axial centers about which the several parts of the mechanism turn, the proper positioning of anvil 22 and screw 21 with respect to the axes of levers 14 and 24, and by providing proper clearance between the screw 21 and anvil 22, tubes of a considerable range of diameters may have collars formed thereon of substantially uniform diameter.

Referring now to Fig. 3, circles R and $R_1$ represent two support rollers of equal fixed diameters and whose centers are a fixed distance ($2 \times b$) apart on the base line L—L.

Circles T and $T_1$ represent two different tubes whose radii are $r$ and $r_1$, respectively of the minimum and maximum sizes desired to form.

Characters $m$ and $m_1$ represent the desired radii of the collars to be formed which are the same for both T and $T_1$.

When a tube of the size T is being formed the guide roller will bear on the top of T at distance $d$ from the base line and the forming roller will be stopped at distance $a+m$ where $a$ is the vertical distance from the base line L—L to the axis of the tube T.

When $T_1$ is being formed the guide roller will bear on the top of $T_1$ at distance $d_1$ from the base line and the forming roller should be stopped at distance $a_1+m_1$.

Therefore the difference of position of the guide roller in the two cases $= d_1 - d = f$ and of the forming roller $= (a_1 + m_1) - (a + m) = a_1 - a = e$.

In other words if the position of the guide roller is changed by distance $f$, the position of the forming roller must be changed by distance $e$ which is always less than the distance $f$.

Character A represents the length, which may be chosen arbitrarily, of the guide roller arm which is pivoted at B, and E represents the stop point on the arm which for convenience is chosen as ⅓ the distance from B to the roller and therefore $$\frac{2A}{3}$$

from the roller.

Accordingly, if the guide roller is moved distance $f$, E will move $$\frac{f}{3}$$

and we have the proportional equation $$f:\frac{f}{3}=A:\frac{A}{3}$$

If now $$\frac{2A}{3}+X$$

represents the length of the forming roller arm pivoted at D and the forming roller is moved distance $e$ when E is moved $$\frac{f}{3}$$

we have the proportional equation $$e:\frac{f}{3}=\left(\frac{2A}{3}+X\right):X$$

If the above equation is solved for X, we derive the length of the forming roller arm and X less $$\frac{A}{3}$$

equals the distance between pivots B and D. All this neglects error due to angular motion of the arm but if the arm length A is great as compared with the distance $f$ the angle through which the arms move is small and the error is negligible. This is particularly true when pivots B and D are located approximately on a level with the top of the tube T.

Restating the foregoing in more general terms, it may be pointed out that, when tubing of various sizes is supported on a pair of spaced rollers, any increase in tubing diameter over a predetermined minimum will result in an increase in elevation of the upper surface of the tube and a similar increase in elevation of the central axis of the tube, neither of which is directly proportional to the increase in tube diameter due to the lateral displacement of the point of contact of the tubing with the supporting rollers from the vertical axis of the system. If it is assumed that the minimum tubing diameter to be handled on the present apparatus is the same as the minimum collar diameter to be formed on the tubing, it may be stated that any increase in diameter of the tubing to be reshaped over and above this predetermined minimum will require a displacement of the surface of the tubing inwardly toward its axis, the amount of displacement increasing as the diameter of the initial tubing is increased.

The foregoing considerations require that the control lever have a shorter length than the forming lever, so that the position of the forming roller on the end of the forming lever is always nearer to the longitudinal axis of the tubing than the end of the control lever for all tubing diameter greater than the predetermined minimum. In determining the length of these lever arms and their pivot points, it must be kept in mind that the lever arms should be long as compared with the vertical distances through which their ends are to be displaced, and the levers should be as nearly normal to the vertical center line of the apparatus as possible. It has been found convenient with respect to this latter consideration to design the arms to be horizontal when operating on a tube of average diameter and for the pivot points to lie on a line substantially tangentially to the average tube the apparatus is designed to accommodate. In actual practice the use of rollers of appreciable diameter results in the placement of the pivot points a distance above the surface of the tube equal to the radii of the respective rollers. By proportioning the lever arms as described in the equations above, keeping in mind the general considerations heretofore advanced, an apparatus can be produced which will form collars of substantially constant diameter on pieces of tubing having a considerable variation in diameter without manual control of the apparatus to compensate for such variation in the initial tubing.

What is claimed is:

1. In a glass article reshaping apparatus, rollers for supporting and rotating articles about their axial centers, means for heating a section of a supported article to plasticity, a shaping element engaging the heated section and exerting pressure thereon and, as the section becomes plastic, moving in the direction of the axial center of the article, a stop, and a movable support for said stop adapted to engage an unheated portion of the article to position said stop to halt the movement of said element after it has moved to within a predetermined distance of the axial center of the article irrespective of its diameter.

2. In a glass tube reshaping apparatus, rollers for supporting and imparting rotating motion to a tube, means for heating a section of the tube to plasticity as it is being rotated by said rollers, a reshaping tool comprising a lever pivoted at one end and having a shaping roller mounted on the other end adapted to exert pressure on the section of the tube being heated, a stop for limiting the extent of movement of the lever to restrict the distance of movement of the roller into the softened glass, and a support for said stop comprising a lever pivoted at one end and carrying a roller at the other end adapted to rest on an unheated section of the tube.

3. In a glass tube reshaping apparatus, rollers for supporting and imparting rotating motion to a tube, means for heating a section of the tube to plasticity as it is being rotated by said rollers, a reshaping tool comprising a lever pivoted at one end and having a shaping roller mounted on the other end adapted to exert pressure on the section of the tube being heated, a stop for limiting the extent of movement of the lever to restrict the distance of movement of the roller into the softened glass, and a support for said stop comprising a lever pivoted at one end and carrying a roller at the other end adapted to rest on an unheated section of the tube, the pivot point of said stop support lever being nearer the tube being worked on than the pivot point of the reshaping lever.

4. In an apparatus for forming collars on glass tubes, a pivoted lever having a collar forming roller on its free end adapted to rest on a tube to be reformed, rollers for supporting and rotating the tube about its axial center, means for heating a section of the tube upon which the roller rests whereby as such section becomes plastic the forming roller moves to displace the same, a second pivoted lever having a control roller at its free end adapted to rest on the tube, and means on said latter lever for restricting the movement of said first lever whereby the distance of movement of the forming roller is limited by the position at which said second pivoted lever is held by engagement of its roller with the tube.

5. In a glass working apparatus a pair of spaced rotating supports having parallel axes of rotation arranged in the same horizontal plane, a lever pivoted about an axis arranged parallel to those of said supports and substantially laterally with respect thereto and having at its free end a forming roller whose axial center is substantially directly above a point midway between said supports, so that the axial center of the roller is substantially directly over that of a tube resting on said supports, means for softening the glass upon which said forming roller rests to enable said roller to move toward the axial center of the tube, a second lever pivoted about an axis intermediate and parallel to that of the first lever and the axes of said supports and having a device at its free end adapted to rest upon the tube, and means arranged intermediate the ends of the latter lever in the path of travel of said first lever for stopping the movement of the forming roller toward the axial center of the tube after a movement thereof a distance depending upon the position of said means.

6. In a glass working apparatus rollers for supporting and rotating a circular glass article, means for heating a predetermined area of the circumference of the article as it is rotated, means for displacing said heated portion of the article inwardly toward its axis, a roller engaging the unheated surface of the article, and a stop positioned by said element to limit the displacement of the heated portion proportionately to the diameter of the article.

7. In a glass working apparatus rollers for supporting and rotating a circular glass article, means for heating a predetermined area of the circumference of the article as it is rotated, means for displacing said heated portion of the article inwardly toward its axis and means engaging the unheated surface of the article to limit the distance the heated portion is displaced, said limiting means comprising an arm pivoted for movement about an axis parallel to the axis of the article and spaced a substantial distance therefrom, said second means comprising an arm pivoted for movement about an axis spaced a lesser distance from said article than the first named axes, said axis lying in a plane substantially tangential to the circumference of said article.

8. In an apparatus for reheating and reshaping a portion of a circular glass article, a shaping roller adapted to engage a heated portion of the article, a control roller adapted to engage an unheated portion of the article, pivoted supports for said rollers, and a stop carried by the control roller support in the path of movement of the former roller support to restrict the movement of the former roller in a manner dependent on the position at which said control roller support is held by engagement of its roller with the article.

DAVID E. GRAY.